(12) United States Patent
Eto

(10) Patent No.: US 6,210,569 B1
(45) Date of Patent: *Apr. 3, 2001

(54) DEVICE FOR COLLECTING WATER POLLUTING PHYTOPLANKTON DRIFTS AND METHOD FOR COLLECTING WATER POLLUTING PHYTOPLANKTON DRIFTS

(75) Inventor: Shunji Eto, Koganei (JP)

(73) Assignee: Aquatech, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/009,245

(22) Filed: Jan. 20, 1998

(30) Foreign Application Priority Data

Jan. 21, 1997 (JP) ........................................... 9-022090
Oct. 14, 1997 (JP) ........................................... 9-296214

(51) Int. Cl.⁷ ................................................. B01D 21/00
(52) U.S. Cl. ......................... 210/170; 210/312; 405/74
(58) Field of Search ................................. 210/170, 154, 210/162, 299, 312, 747, 249, 532.1, 484, 485, 289, 153, 155; 43/56; 405/74

(56) References Cited

U.S. PATENT DOCUMENTS

| | | | |
|---|---|---|---|
| 2,602,261 | * 7/1952 | Mann | 43/56 |
| 3,799,349 | * 3/1974 | Stewart | 210/154 |
| 4,259,926 | 4/1981 | Marliave | 119/2 |
| 4,421,644 | * 12/1983 | Gedye | 210/233 |
| 4,594,024 | * 6/1986 | Jenkner et al. | 210/154 |
| 5,143,623 | * 9/1992 | Kroll | 210/705 |
| 5,279,895 | * 1/1994 | Johnson | 405/41 |
| 5,565,103 | * 10/1996 | Eto | 210/601 |
| 5,632,889 | * 5/1997 | Tharp | 210/170 |
| 5,855,774 | * 1/1999 | Boelter | 210/155 |

FOREIGN PATENT DOCUMENTS 62-182308 * 8/1987 (JP).
62-250998 10/1987 (JP).

* cited by examiner

Primary Examiner—David A. Simmons
Assistant Examiner—Frank M. Lawrence
(74) Attorney, Agent, or Firm—Armstrong, Westerman, Hattori, McLeland & Naughton

(57) ABSTRACT

A device for collecting water polluting phytoplankton drifts and a method for collecting water polluting phytoplankton drifts by use of such device is provided such that the deterioration of water quality as a result of extraordinary proliferation of phytoplankton is suppressed and prevented such that a water area is kept clean. The device 1 for collecting water polluting phytoplankton drifts defines a predetermined volume of space therewithin with enclosing faces, the enclosing faces including at least one face section 3 composed of a water blocking member and other face sections 4 and 5 composed of a plurality of water admitting members, each water admitting member being formed with a plurality of water admitting holes.

17 Claims, 7 Drawing Sheets

DEVICE FOR COLLECTING WATER POLLUTING PHYTOPLANKTON DRIFTS AND METHOD FOR COLLECTING WATER POLLUTING PHYTOPLANKTON DRIFTS

BACKGROUND OF THE INVENTION

The present invention relates to a water polluting phytoplankton drifts collecting device, and more particularly to a water polluting phytoplankton drift collecting device, which collects water polluting phytoplankton drifts and dormant spores thereof vegetating in dead water areas like lakes and marshes, to prevent them from proliferating in such water areas to cause the pollution thereof, thereby improving the water cleanliness there.

In water areas, such as lakes and marshes or dams, it has frequently been reported that the movements of the water are stagnant and tend to be subject to supernutrition due to the change recently seen in the life style of people living therearound and the extraordinary proliferation of phytoplankton. Such extraordinary proliferation of phytoplankton not only mars the appearance of the water areas but also hinders branchial respiration of fishes and causes living things in the lower water layers to perish due to the lack of oxygen there and invites the deterioration of the water quality which can result in a musty smell in tap water.

Conventionally, there have been proposed a variety of measures to prevent the proliferation of phytoplankton including (1) a method of preventing the proliferation of the water polluting phytoplankton by removing nutritious substances by means of phosphorus (P) or nitrogen (N) compounds, silica ($SiO_2$), or the like; (2) a method of killing the phytoplankton by use of algicides, such as copper sulfate, chlorine ($Cl_2$) or the like; and (3) an air pumping pipe method to forcibly circulate the dead water by use of an air pumping pipe to increase the oxygen existent in the water while guiding the algae growing on the water surface portion into the deep layer of the water where sufficient sunlight will not reach.

Of the foregoing measures, however, the method (1) designed to remove the nutritious substances which flow into lakes and marshes is not easy to adopt in view of the construction costs of facilities and equipment and the running costs for the maintenance thereof. Furthermore, it is impossible to completely remove the nutritious substances from unspecified polluting substances, thus making the whole scheme too difficult to be effective. Furthermore, the measure (2) to kill phytoplankton by addition of algaecides is not generally applicable because it can cause a further pollution if the water in the water area has a wide variety of applications. Furthermore, the air pumping measure (3) which forcibly pumps the water in the water area for circulation to shorten the staying period of the surface water is not effective and is considered to be inapplicable because, if the water depth is not sufficient, it will not guide algae on the water surface into a deeper water layer which the sufficient sunlight will not reach.

The present invention is designed to solve the technical problem referred to in the foregoing and the object of the invention is to provide a water polluting phytoplankton drift collecting device. The invention was conceived by taking into consideration the shortcomings of the current attempts to prevent or forestall the extraordinary proliferation of phytoplankton in the water area as mentioned above. Particularly, it is possible to prevent the proliferation of the phytoplankton in the water areas of a shallow depth from causing the water quality to deteriorate for the purpose of maintaining the water area clean.

The inventor realized that although it is impossible to completely prevent the phytoplankton from vegetating, the phytoplankton rather serves to absorb the nutrition such as nitrogen, sulfur, silica, etc. in the water flowing into water area like lakes, thereby purifying the polluted water, and intended to take advantage of it in order to accomplish the above objectives. Based on this understanding, therefore, the invention is designed to use the phytoplankton for removing the nutritious substances contained in flown-in waters instead of preventing such phytoplankton from vegetating and then, separating the water polluting phytoplankton drifts or their dormant spores to remove the same from the water.

In other words, the inventor made intensive research to come up with a device which is capable of maintaining a water area clean by absorbing and removing the nutritious substances flowing into the water area by use of phytoplankton and then collecting the water polluting phytoplankton drifts such that the scattering thereof is prevented.

As a result, the inventor conceived of a device which is inexpensive and capable of effectively functioning in shallow lakes and marshes by collecting phytoplankton drifts and its dormant spores during the winter at a predetermined place and, after collecting them, keeping them from proliferating in the water area such that the water quality is maintained in a clean state. In this connection, the water polluting phytoplankton drifts primarily means the organic polluting substances consisting of phytoplankton and its dormant spores.

SUMMARY OF THE INVENTION

According to the present invention, there is provided a device for collecting water polluting phytoplankton drifts to be disposed on a water bottom and to enclose and define a predetermined volume of space therewithin with enclosing face means, said enclosing face means comprising at least one face section composed of a water blocking member and other face sections composed of a plurality of water admitting members, each water admitting member being formed with a plurality of water admitting holes.

In the water polluting phytoplankton drift collecting devices according to the present invention, it is preferred that said at least one face section of the water blocking member includes a floor or a floor member pre-installed on the water bottom and said other face sections include a face section of either side faces or a top face of water admitting members. It is also preferable that said water admitting members are formed with water admitting holes therein each having a diameter of 3 to 50 mm and it is more preferable that said water admitting members are constructed of netting having a mesh size of 3 to 50 mm and said netting is a wire net.

Furthermore, it is preferable that said water admitting members are planar members formed of rectangular holes of 3 to 50 mm lengthwise and crosswise and that the planar water admitting members are formed of plastics. Furthermore, it is also preferable that said planar water admitting members are attached to frameworks having a strength to maintain the configuration of the space by way of catches, each having hook portions for attaching the water admitting member thereto.

Furthermore, it is also preferable that the other side face sections formed of water admitting members for maintaining the predetermined volume of space of the water polluting phytoplankton drift collecting device is of at least a two-layer structure. It is also preferable that the multi-layer structure has interlayer spacing of 100 to 1,000 mm therebetween.

Furthermore, it is preferable that the floor formed by the water blocking member is provided with a pipe connected to a pump such that the water polluting phytoplankton drifts accumulating on the floor are discharged outside of the device and it is preferable that one of said other face sections is formed with an openable exit for workers.

It is also preferable that said water polluting phytoplankton drift collecting device is disposed on the bottom of the water area of a depth less than about 6 meters. In this way, the water polluting plankton drifts periodically collected are removed such that the water area is maintained clean.

Furthermore, the present invention provides a method of collecting water polluting phytoplankton drifts characterized in that said water polluting phytoplankton drift collecting device is disposed for a predetermined period on the bottom of the water area with one face section formed of a water blocking member as a floor or on a floor member pre-installed on the water bottom to collect water polluting phytoplankton drifts within the device.

In the method of collecting water polluting phytoplankton drifts according to the present invention, it is preferable that the device is disposed on the bottom of the water area with a depth of less than about 6 meters to cause the container to collect therein the water polluting phytoplankton drifts growing of the water area. It is also preferable that the water polluting phytoplankton drifts accumulating in the device are removed continuously after a predetermined period of time has lapsed since the device is disposed on the bottom such that the water area is cleaned. Furthermore, it is also preferable that the water polluting phytoplankton drifts accumulating in the space of the device are continuously sucked and removed by a pump after said predetermined time period such that the water area is continuously cleaned.

The device according to the present invention is thus constructed with at least one face section formed of a water blocking member and oriented downwardly as a floor to be disposed on the bottom of the predetermined water area. The other face sections are formed of water admitting members having a plurality of water admitting holes and connected to said floor of the water blocking member to enclose and define a space of predetermined volume in cooperation with the side faces and the top face thereof. For this purpose, the water polluting phytoplankton drift collecting device disposed on the bottom of the predetermined water area is made in such a manner as to permit admission of water into and out of said device. However, the inside of the device is enclosed such that the water movement therewithin is different from the water movement outside thereof in the water area. In this connection, while said one face section forming a floor is composed of a water blocking member, it is also allowed to form such a floor with water blocking member while some of said side face sections are formed with a water blocking member depending on the shape of the water bottom. Also, its is again allowed to install said floor member on the water bottom in advance and then dispose the device for collecting the water polluting drifts thereonto.

In general, the uppermost layer of the water area is in motion as a result of being influenced by natural phenomena, such as winds or the like. Particularly, the water in the water area susceptible to water movement where the water polluting phytoplankton drift collecting device according to the present invention is to be disposed tends to be brought into motion in a wide range of from 0 meter per second to 1.5 meters per second by the blow of winds and their inertia in the water area. When the flow rate is 0.3 meter per second or more, water polluting drifts accumulating on the bottom of the water area will surface again to spread and float over the whole range of the water area.

In case in which a gradient in the flow rate is produced in the water area at the time of water movement, the water polluting phytoplankton drifts in the water area tend to move in the direction of a low flow rate area like ordinary flowing solid matters and accumulate on the bottom of water areas where there is no or little water movement; this is what the inventor refers to as "separation". For instance, the flow rate in the water area near the shore tends to slow down due to the resistance encountered thereby as compared to the center portion of the water area, thus creating a flow rate gradient in the lake or marsh so that the drift accumulation in the portion near the shores increases. The invention is basically made by use of such phenomena.

In other words, although the collecting device according to the present invention allows the free movement of water therethrough, since the side face sections and the top face section are formed of the water admitting members unlike the floor thereof, it functions as a resisting entity against a water movement in the water area. Therefore, even if the water in the water area is caused to move, the flow rate around the device or that rewithin is slower than the outside the device or is substantially nil such that a flow rate gradient around the device is produced. Therefore, water polluting drifts tend to move into the areas around the device where the flow rate is slower to become separated and stay there. Furthermore, said drifts are collected through the water admitting holes of the collecting device where the flow rate is slower therewithin to accumulate and be deposited on the floor.

Furthermore, when there is little or no movement in the water area, water polluting drifts, such as phytoplankton which precipitate from above the device, are collected through the water admitting members into the device to accumulate on the floor thereof Further, since the movement of water within the space is remarkably limited as compared to the outside thereof, there is no resurfacing or scattering of the drift accumulation on the floor of the device to the outside thereof. In particular, it is preferable to assemble the collecting device to form a multi-layer structure such that a larger resistance against the water movement and a larger flow rate gradient are produced to accelerate the drifts "separation".

Furthermore, the water polluting phytoplankton drift collecting device according to the present invention may be designed to have a predetermined height from the floor to allow a sucking means to clean the floor, to remove the drift deposits and to discharge the same out of the water area. In this way, since it is possible to maintain the inside of the device in a clean state, there is no risk that the water polluting drifts collected are scattered again out into the water area, thus making it possible to improve the water quality of the water area and maintain the water area in a stable condition of cleanliness.

As referred to in the foregoing, the water polluting drift collecting device is disposed on the bottom of the water area in motion, particularly, of the water area having a depth of 6 meters or less to reduce the flow rate around the device such that the water polluting drifts are separated to accumulate in the neighborhood of the device due to the flow rate gradient generated thereby. The water polluting drifts accumulating in the neighborhood of the device are further admitted into the device through the water admitting holes in the water admitting members of the face sections such as the side faces and the top face to be trapped and to precipitate and accumulate therein.

Furthermore, since the water polluting phytoplankton drifts accumulating on the floor of the device are protected from, and not subjected to, a strong water movement of the water area, said drifts are prevented from surfacing and scattering again.

The present invention is based on the idea of causing the phytoplankton to consume nutritious substances flowing into lakes and marshes for the water purifying purpose and is designed to trap the water polluting phytoplankton drifts in the device where the phytoplankton drifts trapped therein are pumped out of the water area, thereby making it possible to purify the water area by positively using the phytoplankton instead of killing them.

In the water area in motion, the COD showing the extent of water pollution is said to range between 5 and 25 ppm with proliferating phytoplankton drifts. According to the present invention, it is possible to maintain the density of water polluting substances down to the order of 3 to 15 ppm.

DESCRIPTION OF PREFERRED EMBODIMENTS

A detailed explanation of the invention will be given in reference to the drawings of the preferred embodiments to which however the invention will not be limited.

Figure 1:
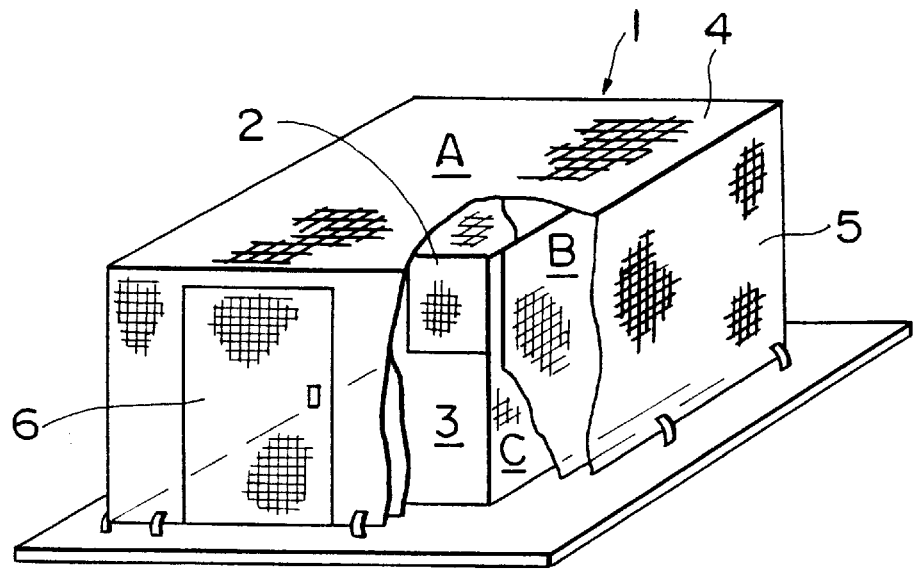
FIG. 1 is an explanatory perspective view of one embodiment of the present invention showing a water polluting phytoplankton drift collecting device.

FIG. 1 is an explanatory perspective view of one embodiment of the present invention, wherein a device 1 for collecting water polluting phytoplankton drifts is shown. Said device 1 has an internal space 2 defined by a floor 3 of a water blocking member, a top face 4 of a water admitting member and side faces 5, again of a water admitting member such that a box-shaped rectangular container is formed. In one of the side faces 5 is provided an exit 6 for drift collecting work such that the device 1 allows communication between the internal space 2 and the outside thereof.

In the collecting device 1 of the invention, said internal space 2 is preferably sized to have a vertical distance or a height of, for example 1 to 3 meters from the floor 3 to the top face 4. Said internal space 2 allows water polluting phytoplankton drifts accumulating in said internal space to be removed by workers or mechanically by using various collecting devices having suction means. Therefore, it is possible to define a rectangular space having a height of 1 to 3 meters, a length of 2 to 20 meters and a width of 1 to 10 meters to allow workers to go into and come out said exit 6. Alternatively, it is possible to introduce the suction means thereinto.

The outside shape or size of the collecting device 1 is not particularly limitative to such values; that is, various rectangular shapes, cylindrical shapes, spherical shapes, conical shapes, or others, may be applicable. In actual practice, the box-like structure, such as a cube or a rectangular parallelepiped, is preferred because of manufacturing easiness.

The top wall 4 and the side walls 5 shown in FIG. 1 constitute outside face sections and are made of water admitting members to form an outermost first layer A. The device 1 further has a second intermediate layer B and an innermost third layer C to eventually form a triple layer structure. In the water polluting phytoplankton drifts collecting device 1 of the present invention, said outside face sections such as the top face 4 and the side faces 5, may not necessarily be of multi-layer structure and the outside face sections may be of a single layer structure, though a multi-layer structure as shown in FIG. 1 is preferred.

When the water movement in the water area becomes remarkable, such face sections of the device of the invention functions as a resistive factor against such water movement in the water area with the result that portions are formed in the surrounding areas or the inner spaces thereof where the flow rates are small or close to nil. Therefore, the smaller flow rates of the portions around the device make the flow rate gradient between the surrounding area and other areas greater while making the influence of the water movement in the water area on that of the inner space of the device less. The number of layers may be selected from the range of 2 to 5 and the normal practice is to make the structure in two to three layers. In this case, the spacing between each adjacent two layers are preferably varied depending on the diameter of the water admitting holes and normally the spacing is in the range of 100 to 1,000 mm.

The collecting device of the invention is disposed on the bottom of an area of water in motion, particularly of 6 meters depth. As described above, the water polluting phytoplankton drifts are trapped in said inner spaces while said drifts are prevented from surfacing again, dispersing and scattering away such that the water polluting phytoplankton drifts are effectively piled up to stay on the floors of the inner spaces.

In the phytoplankton drifts collecting devices of the invention, the basic requirement is the provision of the outside wall sections consisting of the top wall 4 and side faces 5 with water admitting holes and the strength thereof is acceptable if it is sufficient to maintain the predetermined space configuration thereof. The size and number of the water admitting holes are not limitative and may be selected depending on the size of the collecting device, the vastness of the water area in which the device is to be disposed in accordance with the water depth, the change in the water quality, the conditions of the surrounding environment. Usually, it is preferable to use water admitting members having a number of water admitting holes of 5 to 30 mm each in diameter.

Further, it is preferable to selectively use netting of metal or plastic materials or planar members as will be explained, such as netting members including wire nets, or fishing nets commercially available. In cases in which the netting members to be used do not have sufficient strength and are unable to maintain the shape of the inner space, reinforcing members may be used. For example, support members of high strength having, when assembled, a contour of the collecting device may be assembled into a frame and netting members may be secured thereon.

The floor 3 of the water polluting phytoplankton drift collecting device 1 of the present invention is of a water blocking member unlike the top face 4 and the side faces both of water admitting members. Such water blocking structure is not limitative and may be of any form or material so long as the water will not pass therethrough. For example, sheet or plate members of wooden, plastic, metal or any other water blocking members may be used. The surface configuration of said water blocking members is not particularly limitative. Usually, a flat planar member is used though plate members having corrugated surfaces may be used.

Said water blocking member may include, besides a member which will not allow water to pass through at all, a member which, though permeable to water, will not allow phytoplantkton to pass through, such as metal or plastic netting members having a mesh size of about 0.5 mm. Furthermore, the floor 3 of the device for collecting water polluting phytoplankton drifts may be assembled with the water admitting top face 4 and the side faces 5 into an intergral structure. Alternately, it may be of a structure such that the device for collecting the water polluting drifts is disposed on a floor member pre-installed on the water bottom by spreading a board, a sheet, or concrete placed thereon.

Furthermore, FIG. 1 shows that the floor 3 is connected to the outside face sections consisting of the top face 4 and the side faces 5 to define and surround a space 2. In this embodiment, the floor 3 extends beyond the side faces 5 with a predetermined width therearound but the shape of the floor 3 is again not limitative. The floor 3 is satisfactory if it is capable of covering the whole bottom portion of the space surrounded by the outside face sections consisting of the top face 4 and the side faces 5. Specifically, it is satisfactory in the water polluting phytoplankton drift collecting device of the present invention that the size of the floor 3 is consistent with the outline determined by the outside face sections having the walls 5 of water admitting members. Alternatively, the floor 3 may extend beyond the meeting line thereof with the side faces 5 as shown in FIG. 1. Further, the floor and the side faces 5 made of water admitting members to form an outside face section may be connected permanently or connected detachably and replaceably and engageable with each other directly or by way of appropriate connecting members as long as the connection is maintained for a long period of time and the mode of connection is of no limitative nature.

As described in the foregoing, the phytoplankton collecting device of the invention is allowed to be disposed on the bottom of a predetermined water area after the floor 3 made of a water blocking member and outside face sections including the top face 4 and the side faces 5 of water admitting members are assembled to construct the device. It is also possible to define in advance a predetermined space using the outside face sections consisting of the top face 4 and the side faces 5 of water admitting members such as wire netting with the floor portion thereof being kept open to form a rectangular or cubic cage-like structure, or such plural cage-like structures assembled in layers, and disposing such single structure or assembling such plural structures to fixedly dispose on a water blocking board or sheet member laid down in advance on the floor of the water area.

Figure 2:
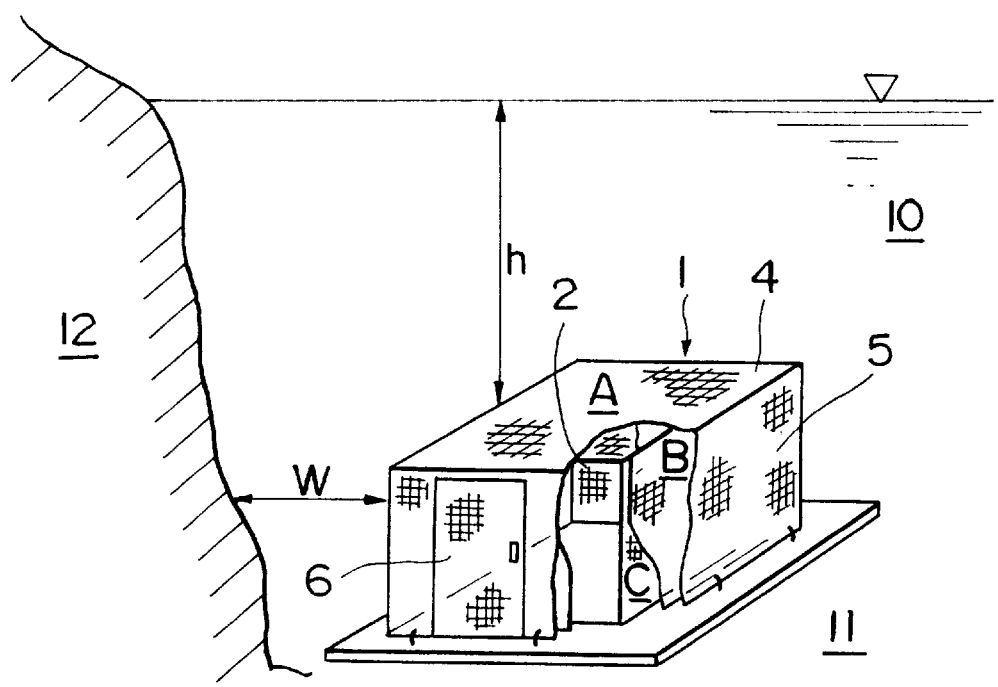
FIG. 2 is an explanatory view of the embodiment disposed in the water area.

FIG. 2 is an explanatory view of one example of disposing the water polluting phytoplankton drift collecting device 1 of the invention on the bottom of the water area.

In other words, the figure is an explanatory perspective view of the state showing the way in which said water polluting phytoplankton drift collecting device 1 is disposed on the bottom 11 of a relatively shallow water area 10 having a depth of, for example, 6 meters or less. FIG. 2 shows the water polluting phytoplankton drift collecting device 1 on the bottom 11 of the water area 10. In cases in which the buoyancy of the collecting device 1 is such that it is difficult to secure the same to the bottom of the water area, appropriate weights may be attached thereto or the device may be connected to a nearby shore.

The water polluting phytoplankton drift collecting device 1 of the invention is preferably disposed on the bottom of the Water area such that the distance from the water surface and the top face 4 of the device ranges between 0.5 to 5 meters. It is also possible to selectively determine the height of the top face from the floor of the space such that the distance between the top face and the water surface is in the above range. If, for example, the height of the water polluting phytoplankton drift collecting device 1 of the invention is in the above range of 1 to 3 meters and the depth of the water area where the collecting device of the invention is disposed is 6 meters or less, the distance from the top face of the device 1 to the water surface is kept at about 5 meters or less.

It is also preferable that the distance w between the nearby shore 12 of the water area and the collecting device 1 is kept more than about 2 meters. Due to the "separation" effect explained in the foregoing, it is well known that the water polluting phytoplankton drifts in the water area tend to be blown toward the low flow rate portion of the water flow caused by the waves and winds in the water area and to sink at the location. The present invention aims at collecting such water polluting drifts which otherwise waft in the middle of the water area.

Furthermore, it is possible to dispose a plural number of water polluting phytoplankton drift collecting devices of the invention in the same water area. The number of water polluting phytoplankton drift collecting devices of the invention to be disposed, the position of and the mode of disposing are not of limitative nature. The conditions, such as the size of the water area, the peripheral environment, the quality of flow-in water or flow-out water, are appropriately selected.

Figure 3:
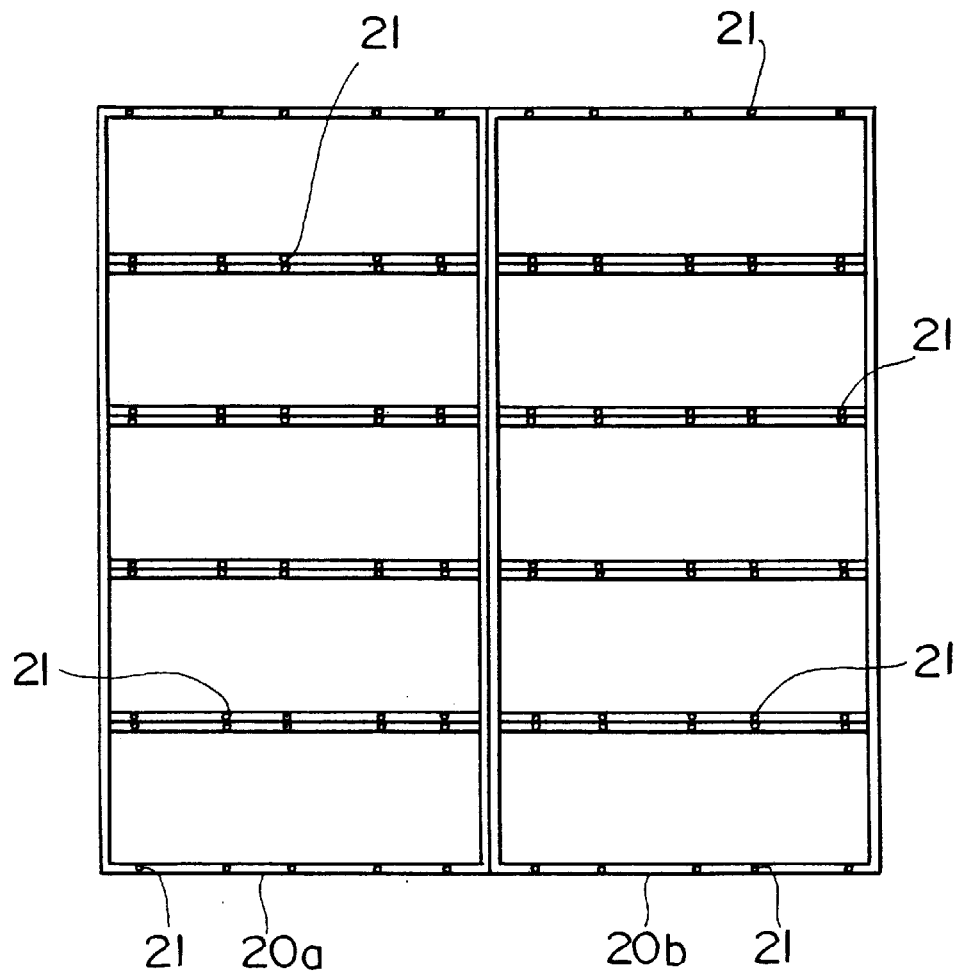
FIG. 3 is a plan view of another embodiment of the present invention showing a framework of the water polluting phytoplankton drift collecting device.
Figure 4:
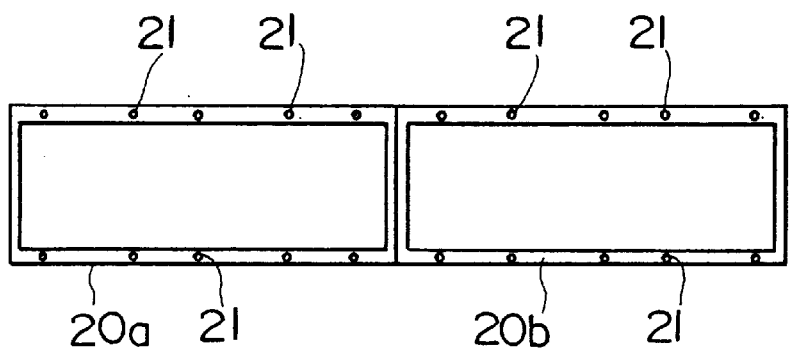
FIG. 4 is a side elevation of FIG. 3.
Figure 5:
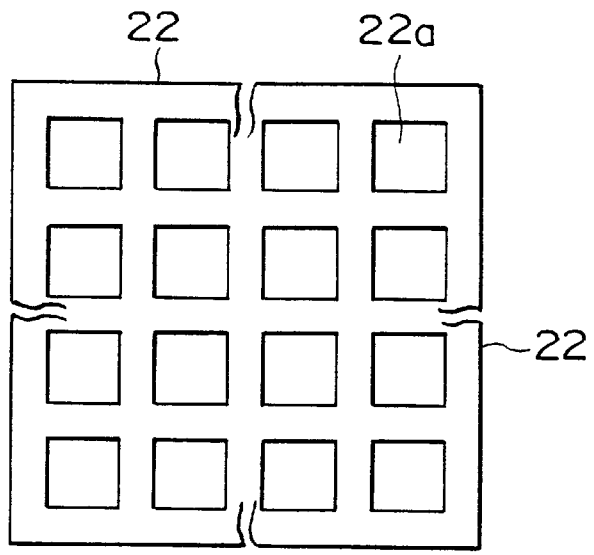
FIG. 5 is a plan view showing a panel of water admitting members to be attached to the framework shown in FIG. 3.
Figure 6A:
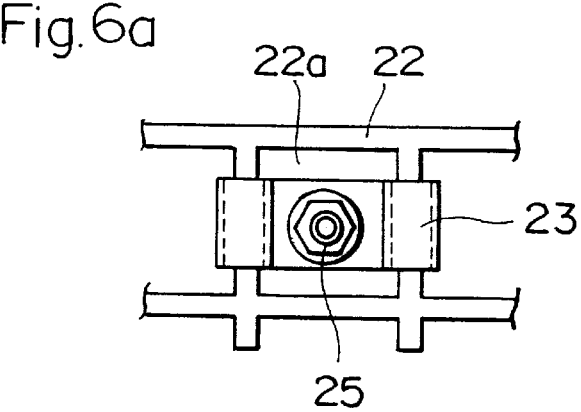
FIG. 6a is a plan view of a catch for attaching the panel shown in FIG. 5 to the framework shown in FIG. 3
Figure 6B:
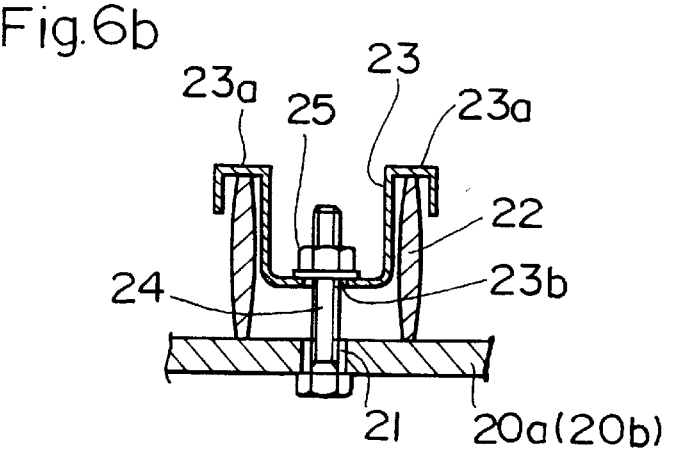
FIG. 6b is a side elevation thereof in cross section.
Figure 7:
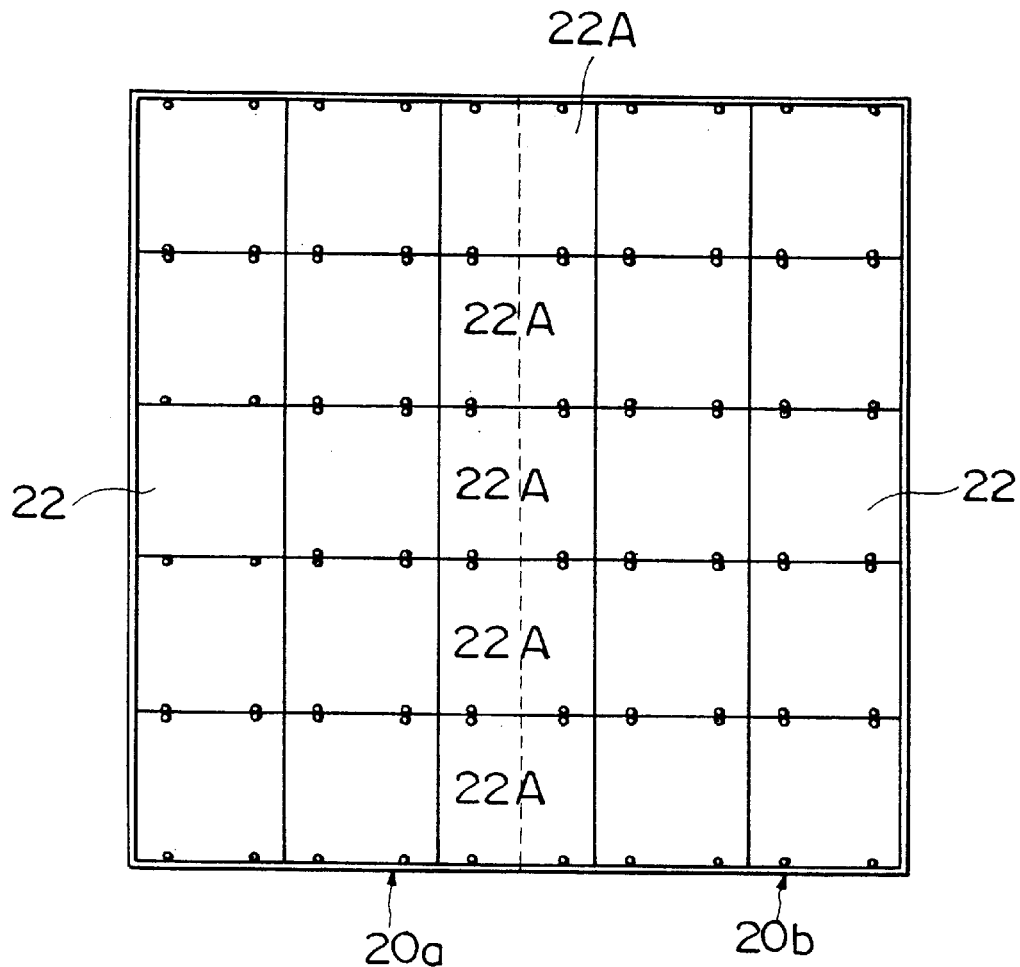
FIG. 7 is a plan view showing the panels of FIG. 5 attached to the framework of FIG. 3.

Furthermore, more specific structures of the water polluting phytoplankton drift collecting device of the invention will be explained referring to FIGS. 3 through 8. In this connection, FIG. 3 is a plan view of frame works 20a and 20b constituting the water polluting phytoplankton drift collecting device 20; FIG. 4 is a side elevation thereof; FIG. 5 is a plan view of a water admitting member such as a panel; FIG. 6a and FIG. 6b are views showing the state in which said panel is attached to the frameworks 20a and 20b by use of catches, or the like; FIG. 7 is a plan view showing the assembled state of the water polluting phytoplankton drift collecting device; and FIG. 8 is a side elevation thereof.

The frameworks 20a and 20b are of steel structure assembled in pairs (as shown in FIG. 3) to form a rectangular planar configuration which is square. Said frameworks 20a and 20b are separate members and assembled into a single structure by a panel, as will be explained later. As shown in FIG. 3 and FIG. 7, the panels are sized such that each of the frameworks 20a and 20b is attached with five panels 22 to align in a lengthwise direction and with two and a half panels 22 to align in a crosswise direction.

Figure 8:
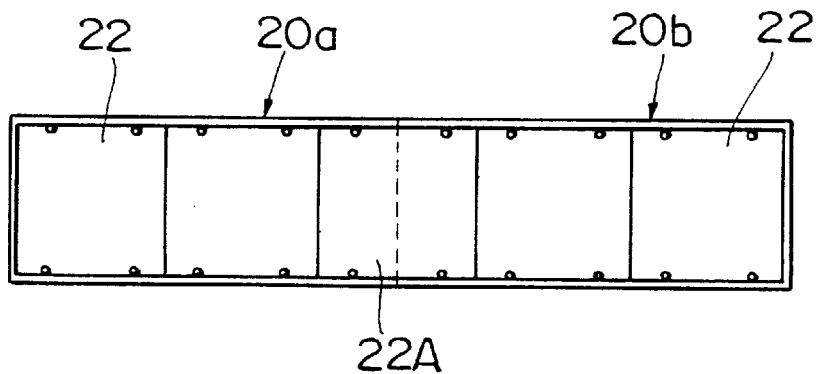
FIG. 8 is a side elevation of FIG. 7.

Furthermore, the side portion of the frameworks 20a and 20b are attached each with a single panel 22 in a lengthwise direction and two and a half panels 22 in a crosswise direction as shown in FIG. 4 and FIG. 8. Furthermore, bolt holes 21 are formed at a predetermined places for the attachment of panels 22.

Said panel 22 is square-shaped as shown in FIG. 5 and is formed inside thereof with a plurality of rectangular water-admitting holes 22a, the size of which are designed in the range of 3 to 50 mm. The panels 22 are formed of plastic material which is corrosion resistive for a long period of service life.

For attaching said panels 22 to the frameworks 20a and 20b, catches 23, as shown in FIG. 6, are used.

Each catch 23 is U-shaped and is formed at an open end thereof with hook sections 23a for engagement with a panel 22. Furthermore, bolt holes 23b to receive bolts 24 for mounting the panel 22 onto the frameworks 20a and 20b are formed. In this connection, the catch 23 is formed of metal.

Furthermore, said panels 22 are arranged at predetermined positions on the frameworks 20a and 20b before bolts 24 are inserted into the bolt hole 21 bored in the frameworks 22a and 22b through the water admitting holes 22a in the panel 22 and the bolt holes 23b bored in each catch 23.

On the other hand, said hook section 23a of the catch 23 is brought into engagement with side faces formed with water-admitting holes in the panel 22. In this condition, the nut 25 is screwed onto the bolt 24 from the catch side 23 such that the panel 22 is attached to the frameworks 20a and 20b.

Said panels 22 are attached onto each framework 20a or 20b such that five panels are aligned in a lengthwise direction, while two and a half panels are aligned in a crosswise direction and only one panel is attached in a vertical direction. The frameworks 20a and 20b are separate members for the easiness of transport, custody and handling.

In the final stage of assembly, the frameworks 20a and 20b are arranged in parallel and the panel 22A straddling the frameworks 20a and 20b is attached thereto by way of the catches 23. In this way, when the panels 22 straddling the frameworks 20a and 20b are attached, said frameworks 20a and 20b are made integral by means of said panel 22. Therefore, not only the assembling work is facilitated but also the need for joining said frameworks 20a and 20b by welding work has been eliminated, thus reducing the manufacturing costs.

Figure 9:
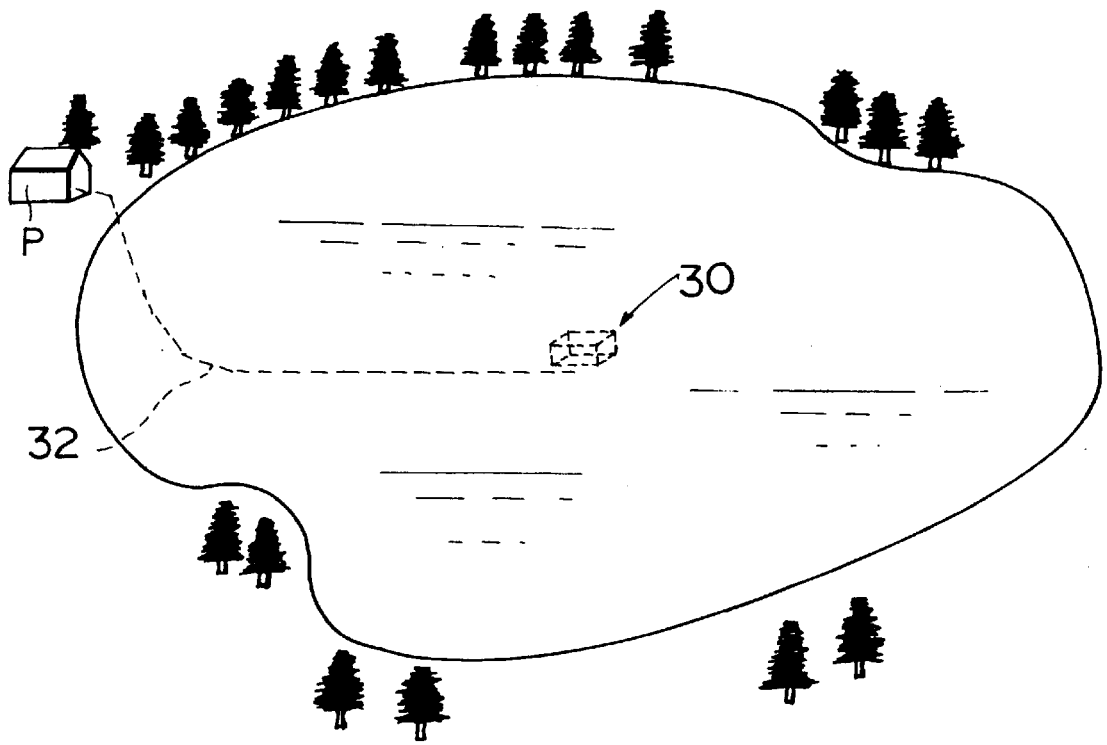
FIG. 9 is an explanatory view of a further embodiment of the present invention showing a water polluting phytoplankton drift collecting device.
Figure 10:
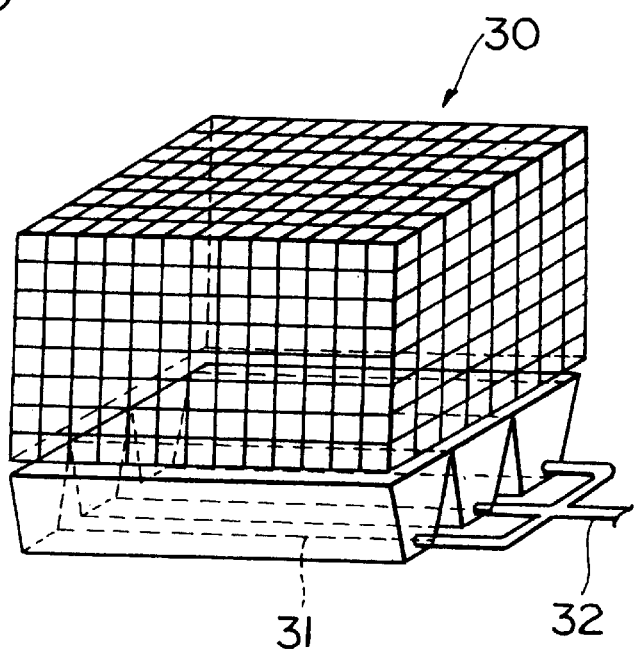
FIG. 10 is a general perspective view of a still further embodiment of the present invention showing a water polluting phytoplankton drift collecting device.

Furthermore, another embodiment of the water polluting phytoplankton drift collecting device according to the present invention will be explained referring to FIG. 9 and FIG. 10.

In this embodiment, the water polluting phytoplankton drifts accumulating in the device 30 can be automatically removed from the device 30. In other words, the floor surface 31 is provided in the form of gutters with side walls thereof being attached with a pipe 32 connected to a pump P. Said pump P is located at a location away from the water area and is started after a period of time to suck the water polluting phytoplankton drifts accumulating in the gutter-like floor surfaces 31 until removing the same from the collecting device 30. In this way, the water polluting phytoplankton drifts can be removed from the collecting device 30 easily by using a pipe connected to the pump on one hand and the gutter-like floor surfaces on the other without the use of manual work, thus reducing the operation costs.

Next, a test was conducted to see the accumulation of water polluting plant plankton drifts for various diameter of water admitting holes.

In this test, the water polluting plant plankton drift collecting device was set up on the bottom of an artificial pond having an average depth of 6 meters for the test period of 8 days and then was drawn up from the bottom of the water area to study the accumulation of the water polluting phytoplankton drifts. The flow rates of the water surface of the artificial pond during the test period was 0 to 1 meter per second while the water quality was such that the water contains 115 mg/l of chlorophyll a, 50 mg/l of SS. In this context, SS means residual matters obtained by filtering a water sample through a 1 $\mu$ filter and drying it at a temperature of 105° C. for 2 hours.

For the purpose of checking the accumulation of the water polluting phytoplankton drifts for various of diameters of the water admitting holes, a water polluting phytoplankton drift collecting device having single layer side face sections, with the water admitting holes (mesh size) having the lengthwise and crosswise sizes of 2 mm (Comparative Example 1), 3 mm (Example 1), 10 mm (Example 2), 20 mm (Example 3), 40 mm (Example 4), 50 mm (Example 5), and 60 mm (Comparative Example 2).

The water polluting phytoplankton drift collecting device used in Example 1 has a lengthwise size of 100 mm, a crosswise size of 100 mm, and a vertical size of 400 mm.

The water polluting phytoplankton drift collecting device used in Example 2 has a lengthwise size of 120 mm, a crosswise size of 120 mm, a vertical size of 400 mm. The water polluting phytoplankton drift collecting device used in Example 3 has a lengthwise size of 200 mm, a crosswise size of 200 mm and a vertical size of 400 mm. Furthermore, the water polluting drift collecting device used in Example 4 has a lengthwise size of 400 mm, a crosswise size of 400 mm and a vertical size of 400 mm. The water polluting phytoplankton drift collecting device used in Example 5 has a lengthwise size of 500 mm, a crosswise size of 500 mm and a vertical size of 400 mm.

On the other hand, the water polluting phytoplankton drift collecting device used in Comparative Example 1 has a lengthwise size of 80 mm, a crosswise size of 80 mm, a vertical size of 400 mm. The water polluting phytoplankton drift collecting device used in Comparative Example 2 has a lengthwise size of 600 mm, a crosswise size of 600 mm, and a vertical size of 400 mm.

The results of said tests are shown in TABLE 1 and TABLE 2. TABLE 2 shows the values of weights of phytoplankton drift collected per unit area used in each Example and Comparative Example and obtained on the basis of TABLE 1.

In TABLE 1, the wet weight (g) means a collected water sample itself

The dry weight (g) means a collected water sample filtered or spontaneously dried to a solid state and then-heat dried at a temperature of 105° C. for 2 hours.

VSS (%) means the weight reduction ratio of dried sample heated at a temperature of 600° C. for 30 minutes until it is reduced to ashes and also referred to as the whited heated weight reduction ratio.

SS means a mass of substances obtained by filtering a collected water sample through the 1 g filter and drying the filtered residual at a temperature of 105° C. for two (2) hours.

T-P (mg/drywtkg) means the total phosphorus weight calculated from $PO_4$ obtained after acid decomposition (under pressure) of a water sample.

Initial Volume (ml) means a volume of the water sample at the time of sampling or at the beginning of the precipitation treatment of the sample water.

Precipitation Volume (ml) means the volume of precipitated matters obtained as a result of still standing precipitation for a predetermined time period, said precipitated matters being obtained from the collected water sample of 6 liter.

Calculated Water Contents (%) means the water contents calculated from the Precipitation Volume and SS; that is, it stands for (V×d−s)/v×d, wherein the specific gravity thereof d (d=1.02).

Centrifugal Precipitation Concentrated Slug (water contents %) and (VSS %) means the water contents and the white heated reduction ration (VSS %) of the collected muddy water sample subjected to centrifugal precipitation for concentration at 1000 to 3000 rpm for 5 to 10 minutes and evaporation to drying and then dried at a temperature of 105° C. for 2 hours.

TABLE I

| No. | Example 1 | Example 2 | Example 3 | Example 4 | Example 5 |
|---|---|---|---|---|---|
| Mesh Size | 3 mm | 10 mm | 20 mm | 40 mm | 50 mm |
| Wght (wet) | 65.0 g | 194.0 g | 400.0 g | 428.0 g | 575.0 g |
| Wght (dry) | 9.0 g | 28.1 g | 58.1 g | 72.7 g | 100.0 g |
| VSS | 7.6% | 8.1% | 7.9% | 7.1% | 7.2% |
| SS | 9000 | 28100 | 58100 | 72700 | 1000000 |
| T-P (mg/dry wt kg) | 1020 | 912 | 1110 | 641 | 1090 |
| Initial Volume | 1000 ml | 1000 ml | 1000 ml | 1000 ml | 1000 ml |
| Precipitation | 32 ml | 98 ml | 190 ml | 220 ml | 310 ml |
| Calcurated Water Contents | 72.0% | 71.6% | 70.0% | 67.7% | 68.0% |
| Centrifugal Precipitation Consentrated Sludge | 68.0% for water & 1.9% for VSS | 66.1% for water & 8.5% for VSS | 62.5% for water & 8.1% for VSS | 64.2% for water & 8.3% for VSS | 65.0% for water & 8.4 for VSS |

| No. | Comparative Example 1 | Comparative Example 2 |
|---|---|---|
| Mesh Size | 2 mm | 60 mm |
| Wght (wet) | 13.4 g | 610.0 g |
| Wght (dry) | 1.9 g | 108.0 g |
| VSS | 7.9% | 7.7% |
| SS | 1900 | 108000 |
| T-P (mg/dry wt kg) | 950 | 1010 |

TABLE I-continued

| Initial Volume | 1000 ml | 1000 ml |
|---|---|---|
| Precipitation | 6 ml | 340 ml |
| Calcurated Water Contents | 71.0% | 69.0% |
| Remote Consentration Sludge | 68.0% for water & 8.9% for VSS | 66.1% for water & 8.0% for VSS |

TABLE 2

| No. | Example 1 | Example 2 | Example 3 | Example 4 | Example 5 |
|---|---|---|---|---|---|
| Mesh Size | 3 mm | 10 mm | 20 mm | 40 mm | 50 mm |
| Wght (wet) | 0.65 g/cm² | 1.35 g/cm² | 1.00 g/cm² | 0.28 g/cm² | 0.17 g/cm² |
| Wght (dry) | 0.09 g/cm² | 0.20 g/cm² | 0.15 g/cm² | 0.05 g/cm² | 0.04 g/cm² |

| No. | Comparative Example 1 | Comparative Example 2 |
|---|---|---|
| Mesh Size | 2 mm | 60 mm |
| Wght (wet) | 0.21 g/cm² | 0.17 g/cm² |
| Wght (dry) | 0.03 g/cm² | 0.03 g/cm² |

As seen from the foregoing, the mesh size showing the best trapping ability is 10 mm and the second best is 20 mm. If the mesh size is less than 3 mm and more than 50 mm, it was confirmed that it is impossible to trap any water polluting phytoplankton drifts.

Next, a test was conducted to see how the water polluting phytoplankton drifts accumulate in the case of a single lay structure and a multi-layer structure for the face sections. The conditions of the test are set such as to be identical to those for the tests to study the accumulation of water polluting phytoplankton drifts for various diameters of the water admitting holes mentioned in the foregoing.

Figure 11:
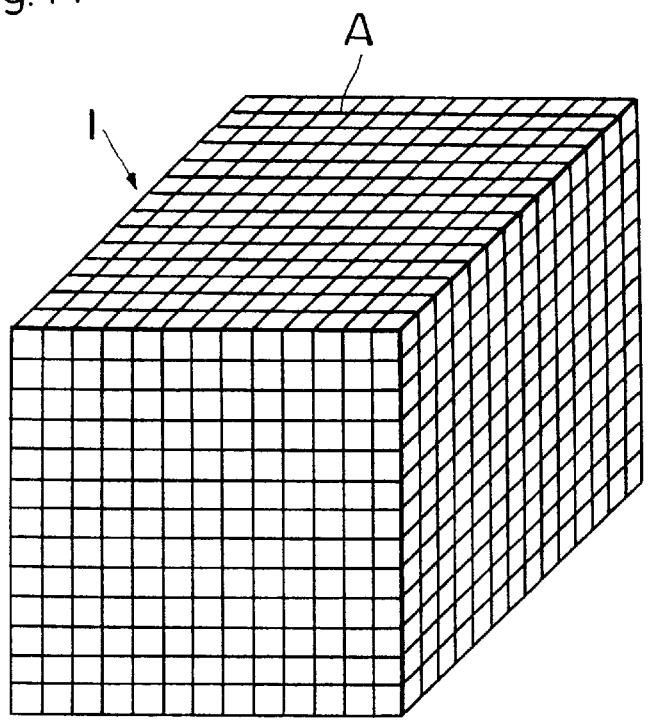
FIG. 11 is a perspective view of the water polluting phytoplankton drifts having a face section of a single layer to be used in the above embodiment.
Figure 12:
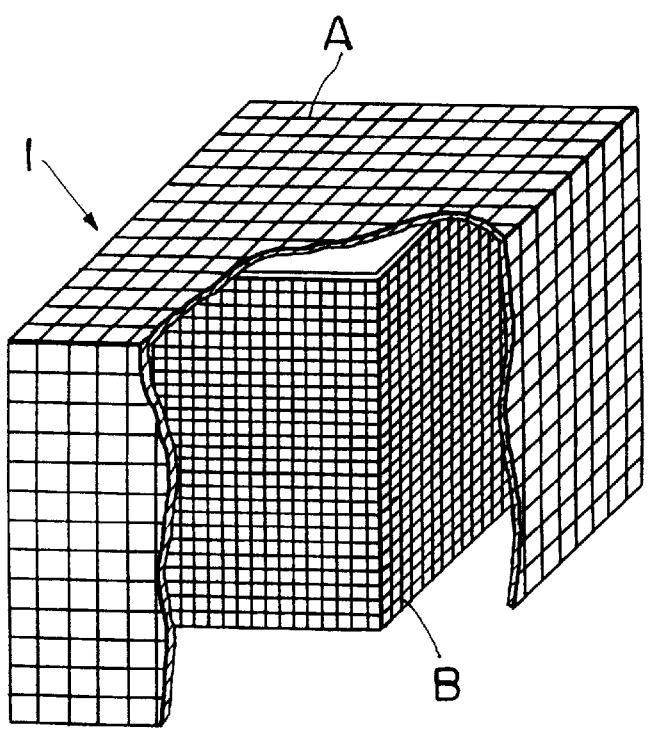
FIG. 12 is a perspective view of the water polluting phytoplankton drifts having face sections of a double layer to be used in the above embodiment.

For each water polluting phytoplankton drift collecting device, FIG. 11 shows that the face sections are of simple layer structure with the water admitting holes (mesh size) of 40 mm lengthwise and crosswise (as in Example 4). Alternatively, FIG. 12 shows that the face sections are of double layer structure (as in Example 6) with each member having the water admitting holes of 20 mm (mesh size) lengthwise and crosswise as in Example 3 shown in FIG. 12 and being accommodated in the other member having water admitting holes therein of 40 mm (mesh size) lengthwise and crosswise as in Example 4 shown in FIG. 12 such that a double layer structure (Example 6) is formed.

Figure 13:
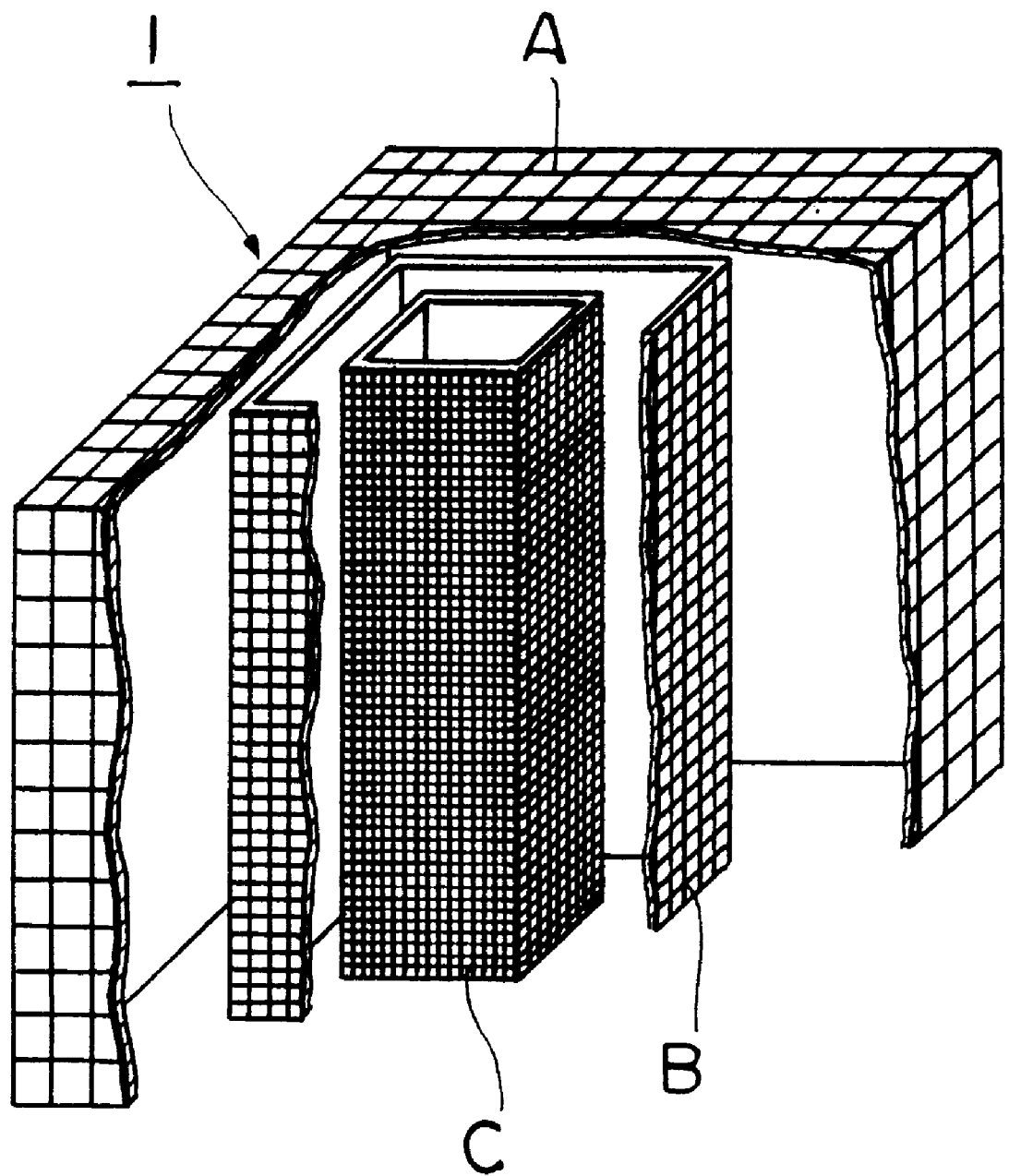
FIG. 13 is a perspective view of the water polluting phytoplankton drift collecting device having face sections of a triple layer to be used in the above embodiment.

FIG. 13 shows that water admitting members having water admitting holes of 40 mm lengthwise and crosswise (mesh size) are accommodated within water admitting members having water admitting holes of 40 mm (mesh size) lengthwise and crosswise. Further therewithin, a structure composed of members having water admitting holes of 10 mm (mesh size) lengthwise and crosswise is accommodated as in Example 1 to form a triple-layer structure (Example 7).

As Comparative Example 3, water admitting members each having water admitting holes of 3 mm (mesh size) lengthwise and crosswise are accommodated within the collecting device of Example 7 having water admitting members each having water admitting holes therein of 10 mm (mesh size) lengthwise and crosswise to form a quadruple structure (Comparative Example 3).

In any of the examples, the top face of the collecting device is of a single layer structure with the water admitting holes having a size of 40 mm (mesh size) lengthwise and crosswise.

The results of the above tests will be shown in Tables 3 and 4. Table 4 shows the amounts of the water polluting phytoplankton drifts trapped per unit area in the respective examples and comparative examples obtained by calculating on the basis of the results shown in Table 3.

TABLE 3

| No. | Example 4 | Example 6 | Example 7 | Comparative Example 3 |
|---|---|---|---|---|
| Mesh Size (in combination) | 40 mm | 20 mm + 40 mm | 10 mm + 20 mm + 40 mm | 3 mm + 10 mm + 20 mm + 40 mm |
| Wght (wet) | 428.0 g | 723.0 g | 629.0 g | 10.0 g |
| Wght (dry) | 72.7 g | 164.9 g | 113.0 g | 2.0 g |
| VSS | 7.1% | 6.8% | 7.2% | 7.1% |
| SS | 72700 | 165000 | 113000 | 2000 |
| T-P (mg/dry wt kg) | 641 | 1090 | 1020 | 980 |
| Initial Volume | 1000 | 1000 | 1000 | 1000 |
| Precipitation | 220 | 468 | 320 | 5.67 |
| Calculated Water Contents | 67.7 ml | 65.5 ml | 65.4 ml | 65.4 ml |
| Centrifugal Precipitation Consentrated Sludge | 64.2% for Water Contents 8.3% for VSS Contents | 61.1% for Water Contents 7.9% for VSS Contents | 60.9% for Water Contents 8.4% for VSS Contents | 60.4% for Water Contents 8.5% for VSS Contents |

TABLE 4

| No. | Example 4 | Example 6 | Example 7 | Compara- Example 3 |
|---|---|---|---|---|
| Mesh Size | 40 mm | 20 mm + 40 mm | 10 mm + 20 mm + 40 mm | 3 mm + 10 mm + 20 mm + 40 mm |
| Wght (wet) | 0.28 g/cm$^2$ | 0.45 g/cm$^2$ | 0.4 g/cm$^2$ | 0.10 g/cm$^2$ |
| Wght (dry) | 0.05 g/cm$^2$ | 0.10 g/cm$^2$ | 0.07 g/cm$^2$ | 0.02 g/cm$^2$ |

As seen from the foregoing, there is no result obtained that shows the trapping of water polluting phytoplankton drifts by the collecting device of quadruple structure consisting of members having holes therein of meshes sizes 3 mm, 10 mm, 20 mm, and 40 mm since the mesh size in the innermost layer is 3 mm. This result is considered to be due to a fact that the 3 layers of the outer layers in the collecting device has collected almost all of the water polluting phytoplankton drifts.

The water polluting phytoplankton drifts collecting device of the present invention can be manufactured easily by using water admitting members and water blocking members at a low cost. Moreover, by disposing the device on the bottom of a relatively shallow water area, water polluting phytoplankton drifts or its dormant spores can be trapped such that they accumulate therewithin instead of the vegetation of phytoplankton being suppressed; on the contrary, the nutritious substances flowing into lakes and marshes are consumed by such phytoplankton and by using this natural phenomenon, the water quality is improved and at the same time the phytoplankton drifts and its dormant spores are trapped in the device to accumulate therein and collected without scattering them outside thereof. As a result, the method is much easier than the prior art methods and it is not necessary to use chemicals, thus making it possible to safely improve the water quality in the water area and to make the water area cleaner.

What is claimed is:

1. A device to be immersed in a water body by disposition on a bottom thereof for collecting water polluting phytoplankton drifts, said device comprising:

a body having face sections including a face section which is impervious to the passage of water and entrained phytoplankton disposed on the bottom of said body and forming a floor therefor, and the remaining face sections being pervious to the passage of water and entrained phytoplankton, said remaining face sections forming sides upstanding from said floor and a top face of said body cooperating with said sides and floor to enclose a region of the body for reception and accumulation of drifts of said phytoplankton, said remaining face sections containing holes throughout their entire extent of a size to create a reduced flow rate between the water body around said device exteriorly of said enclosed region of said floor and the water within said enclosed region of said floor whereby phytoplankton conducted with water passing through said remaining face sections is deposited on said floor for collection.

2. The device according to claim 1, wherein said floor formed by the face section composed of the water and entrained phytoplankton impervious member is pre-installed on the bottom of said water body for reception of said other face sections.

3. The device according to claim 1, wherein each hole of said water pervious members has a size in the range of 3 to 50 mm in diameter.

4. The device according to claim 1, wherein said water and entrained phytoplankton pervious members are formed by netting members each having a mesh size of 3 to 50 mm.

5. The device according to claim 4, wherein said netting members are formed of wire.

6. The device according to claim 1, wherein said water and entrained phytoplankton pervious members include planar members formed with rectangular water admitting holes whose lengthwise and crosswise dimensions are from 3 to 50 mm.

7. The device according to claim 6, wherein said planar members are formed of plastics.

8. The device according to claim 7, including a rigid framework and wherein said planar members are attached by way of catches to said framework, each of said catches having hook portions for establishing connection between said planar members and said framework.

9. The device according to claim 1, wherein said remaining face sections are assembled to form a multi-layer structure having generally parallel sides.

10. The device according to claim 9, wherein said multi-layer structure has an inter-layer spacing between sides of 100 to 1000 mm.

11. The device according to claim 1, including a pipe communicating with said region containing said floor and being connected to a pump through which the water polluting phytoplankton drifts accumulated in said region are discharged from said device.

12. The device according to claim 1, wherein at least one of said remaining face sections is provided with an openable exit for access to said space.

13. The device according to claim 1, wherein said device is disposed on the bottom of a water body with said face section of the water and phytoplankton impervious member facing downwardly for a period of time or on the floor member pre-installed on the bottom of the water body to receive trapped phytoplankton drifts of the water body thereon.

14. The device according to claim 13, wherein said device is disposed on the bottom of a water body having a depth of 6 meters or less to collect water polluting phytoplankton drifts of the water body.

15. The device according to claim 14, wherein said phytoplankton drifts trapped in said space are removed intermittently to continuously purify the water body.

16. The device according to claim 15, wherein said water polluting phytoplankton drifts trapped in the space are intermittently sucked by said pump to continuously purify the water body.

17. The device according to claim 9 in which said device is a double layer structure.

* * * * *